US012693234B2

(12) United States Patent (10) Patent No.: US 12,693,234 B2
Park et al. (45) Date of Patent: Jul. 28, 2026

(54) OPTICAL INSPECTION SYSTEM AND OPTICAL INSPECTION METHOD

(71) Applicant: Samsung Display Co., LTD., Yongin-si (KR)

(72) Inventors: Inhye Park, Yongin-si (KR); Hyunduck Kim, Yongin-si (KR); Yeong-Chang Yi, Yongin-si (KR); Hyeongmin Ahn, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 367 days.

(21) Appl. No.: 18/369,303

(22) Filed: Sep. 18, 2023

(65) Prior Publication Data

US 2024/0201098 A1 Jun. 20, 2024

(30) Foreign Application Priority Data

Dec. 20, 2022 (KR) ........................ 10-2022-0179652

(51) Int. Cl.
*G01N 21/88* (2006.01)
*G01N 21/95* (2006.01)

(52) U.S. Cl.
CPC ......... *G01N 21/8851* (2013.01); *G01N 21/95* (2013.01); *G01N 2021/8887* (2013.01)

(58) Field of Classification Search
None
See application file for complete search history.

(56) References Cited

U.S. PATENT DOCUMENTS

2013/0129183 A1* 5/2013 Nagoshi ................ G06T 7/0004
382/141
2014/0226155 A1* 8/2014 Choo .................... G01N 21/956
356/237.5
2015/0192529 A1* 7/2015 Sato ........................ H10K 71/70
356/73
2025/0184622 A1* 6/2025 Kim ................... G01M 11/0278

FOREIGN PATENT DOCUMENTS

JP          4788549 B2    7/2011
KR         101256369 B1   4/2013
KR       1020160015574 A  2/2016
KR        102174424 B1   11/2020

* cited by examiner

*Primary Examiner* — Dov Popovici
(74) *Attorney, Agent, or Firm* — CANTOR COLBURN LLP

(57) ABSTRACT

An optical inspection system includes: cameras, which capture images of partitioned areas of a substrate, respectively; inspection computers, which receive partial original images corresponding to the partitioned areas from the cameras, respectively, and transmit the partial original images through a many-to-one network; and a storage computer, which receives the partial original images, generates a full original image by merging the partial original images, and generates a full compressed image by extracting an effective area from the full original image.

17 Claims, 9 Drawing Sheets

F I G .  1
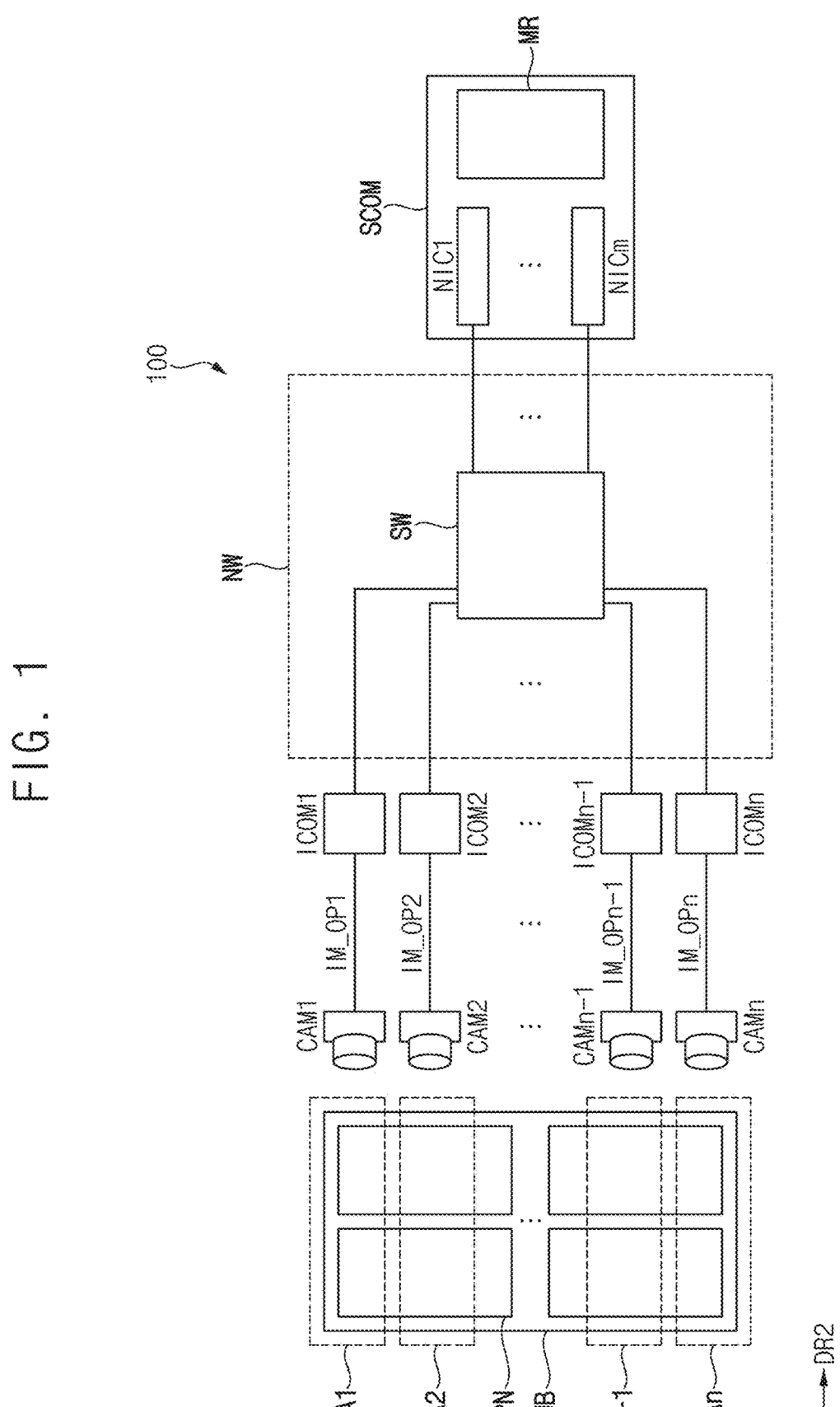

THD1 → IM_OP1

IM_OP2

⋮

⋮

THDm → IM_OPn-1

IM_OPn

FIG. 6

F I G. 7
IM_CE
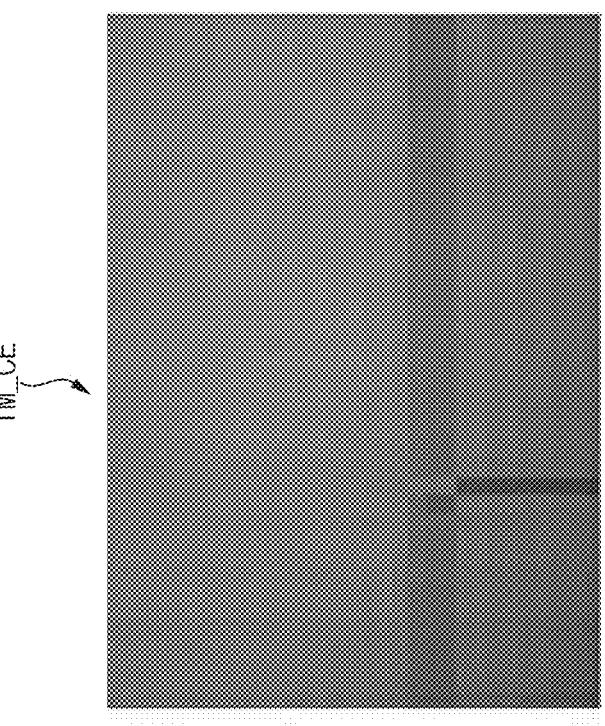
IM_OE
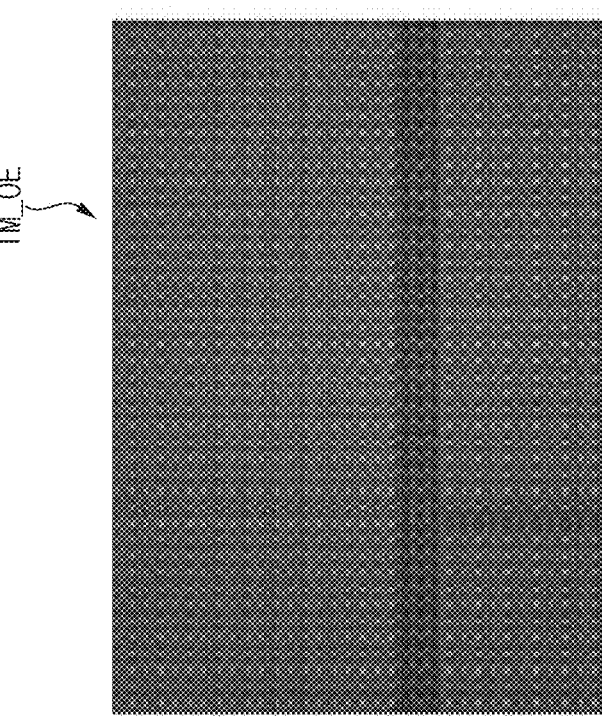

FIG. 9

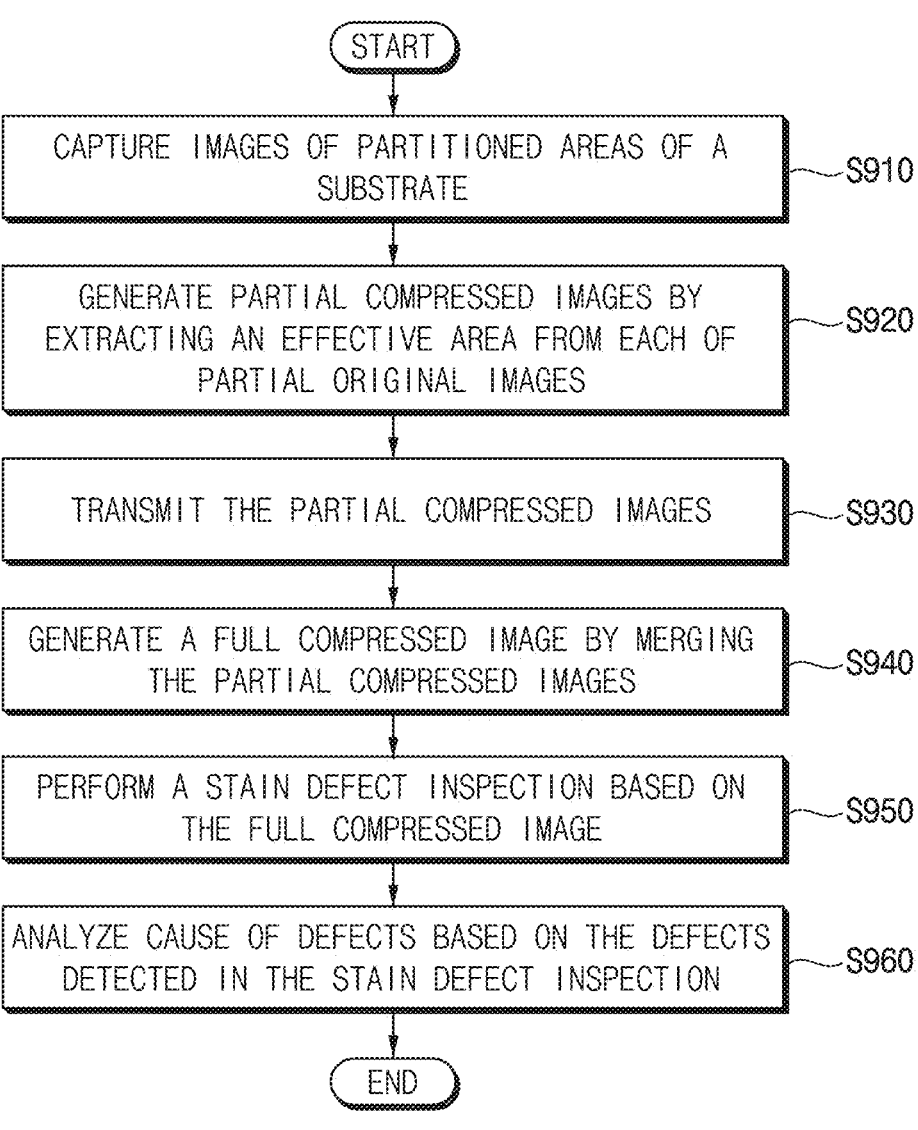

START

CAPTURE IMAGES OF PARTITIONED AREAS OF A SUBSTRATE —S910

GENERATE PARTIAL COMPRESSED IMAGES BY EXTRACTING AN EFFECTIVE AREA FROM EACH OF PARTIAL ORIGINAL IMAGES —S920

TRANSMIT THE PARTIAL COMPRESSED IMAGES —S930

GENERATE A FULL COMPRESSED IMAGE BY MERGING THE PARTIAL COMPRESSED IMAGES —S940

PERFORM A STAIN DEFECT INSPECTION BASED ON THE FULL COMPRESSED IMAGE —S950

ANALYZE CAUSE OF DEFECTS BASED ON THE DEFECTS DETECTED IN THE STAIN DEFECT INSPECTION —S960

END

OPTICAL INSPECTION SYSTEM AND OPTICAL INSPECTION METHOD

This application claims priority to Korean Patent Application No. 10-2022-0179652 filed on Dec. 20, 2022, and all the benefits accruing therefrom under 35 U.S.C. § 119, the content of which in its entirety is herein incorporated by reference.

BACKGROUND

1. Field

Embodiments relate to an optical inspection system. More particularly, embodiments related to an optical inspection system for inspecting a substrate and an optical inspection method.

2. Description of the Related Art

With the development of multimedia, the importance of a display device is increasing. Accordingly, various display devices such as an organic light emitting display ("OLED") device, a liquid crystal display ("LCD") device, a quantum-dot light emitting display ("QLED") device, or the like are being used.

In the process of manufacturing the display device, defects of a substrate on which various layers are formed may be inspected. In order to inspect the defects of the substrate, for example, automatic optical inspection ("AOI") using an image generated by capturing the substrate with a camera may be used.

In the case of storing AOI images generated by capturing a large-area substrate with a high-resolution camera in a limited-size storage medium, a large number of AOI images may not be stored. When an AOI image is compressed to store a large number of AOI images, information may be lost due to image compression, and the defects of the substrate may not be detected based on the AOI image.

SUMMARY

Embodiments provide an optical inspection system that efficiently stores an image for inspecting a substrate and an optical inspection method.

An optical inspection system according to embodiments includes: cameras, which capture images of partitioned areas of a substrate, respectively; inspection computers, which receive partial original images corresponding to the partitioned areas from the cameras, respectively, and transmit the partial original images through a many-to-one network; and a storage computer, which receives the partial original images, generates a full original image by merging the partial original images, and generates a full compressed image by extracting an effective area from the full original image.

In an embodiment, the storage computer may include: network cards connected to the inspection computers, and a memory configured to store the partial original images.

In an embodiment, the inspection computers may be connected to the network cards in a many-to-one manner.

In an embodiment, the storage computer may compress the effective area defined by a plurality of first pixels into a second pixel using an image processing filter. The full compressed image may include the second pixel.

In an embodiment, the image processing filter may include one of an average filter, a median filter, a minimum filter, a maximum filter, a most frequent value filter, and a Gaussian filter.

In an embodiment, the effective area may correspond to an area in which an ink including one of a light emitting material and a color conversion material is filled in the substrate.

In an embodiment, the inspection computers may detect a defective portion from the partial original images and store a defective image including the defective portion.

In an embodiment, the storage computer may perform a stain defect inspection based on the full compressed image.

In an embodiment, the optical inspection system may further include a switch which controls a transmission of the partial original images through the many-to-one network.

In an embodiment, the substrate may be one of a display substrate including a light emitting layer of a light emitting element and a color conversion substrate including a color conversion layer.

An optical inspection system according to embodiments includes: cameras, which capture images of partitioned areas of a substrate, respectively; inspection computers, which receive partial original images corresponding to the partitioned areas from the cameras, respectively, generate partial compressed images by extracting an effective area from each of the partial original images, and transmit the partial compressed images through a many-to-one network; and a storage computer, which receives the partial compressed images and generates a full compressed image by merging the partial compressed images.

In an embodiment, the storage computer may include network cards connected to the inspection computers, and a memory configured to store the partial compressed images.

In an embodiment, each of the inspection computers may compress a corresponding effective area defined by a plurality of first pixels into a second pixel using an image processing filter. Each of the partial compressed images may include the second pixel.

In an embodiment, the optical inspection system may further include a switch, which controls a transmission of the partial compressed images through the many-to-one network.

An optical inspection method according to embodiments includes: capturing images of partitioned areas of a substrate; transmitting partial original images corresponding to the partitioned areas, respectively, through a many-to-one network; generating a full original image by merging the partial original images; and generating a full compressed image by extracting an effective area from the full original image.

In an embodiment, generating the full compressed image may include: compressing the effective area defined by a plurality of first pixels into a second pixel using an image processing filter. The full compressed image may include the second pixel.

In an embodiment, the image processing filter may include one of an average filter, a median filter, a minimum filter, a maximum filter, a most frequent value filter, and a Gaussian filter.

In an embodiment, the optical inspection method may further include: detecting a defective portion from the partial original images; and storing a defective image including the defective portion.

In an embodiment, the optical inspection method may further include performing a stain defect inspection based on the full compressed image.

In an embodiment, the substrate may be one of a display substrate including a light emitting layer of a light emitting element and a color conversion substrate including a color conversion layer.

In the optical inspection system and the optical inspection method according to the embodiments, the partial images may be transmitted through the many-to-one network, the full image may be generated by merging the partial images, and the compressed image may be generated by extracting the effective area from the original image, so that an image for inspecting the substrate may be efficiently stored. Accordingly, a stain defect inspection may be performed based on the stored image, and tracking and feedback of causes of defects may be possible based on the stain defect inspection.

BRIEF DESCRIPTION OF THE DRAWINGS

Illustrative, non-limiting embodiments will be more clearly understood from the following detailed description taken in conjunction with the accompanying drawings.

FIG. 1 is a diagram illustrating an optical inspection system according to an embodiment.

FIG. 2 is a diagram for describing generation of a full original image by merging partial original images according to an embodiment.

FIG. 6 is a diagram for describing generation of a full compressed image by merging partial compressed images according to another embodiment.

FIG. 7 is a diagram illustrating a full original image and a full compressed image according to an embodiment.

FIG. 9 is a flowchart illustrating an optical inspection method according to another embodiment.

DETAILED DESCRIPTION

Figure 3:
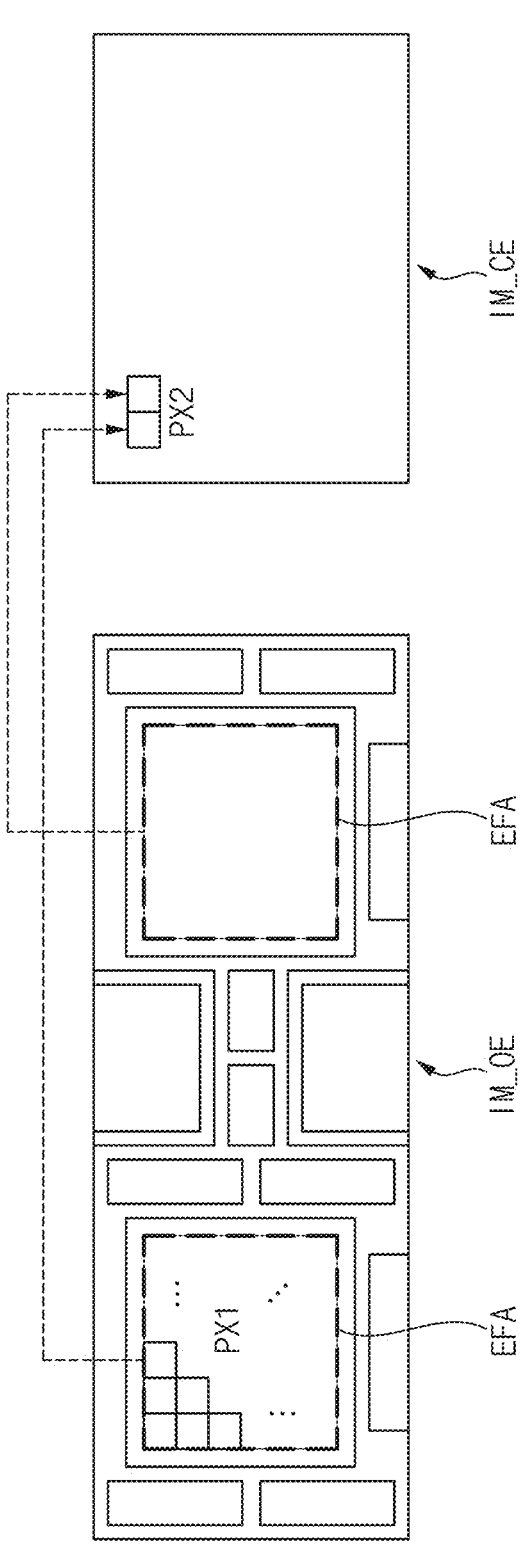
FIG. 3 is a diagram for describing generation of a full compressed image by extracting effective areas from a full original image according to an embodiment.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

"At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, an optical inspection system and an optical inspection method according to embodiments of the present disclosure will be described in more detail with reference to the accompanying drawings. The same or similar reference numerals will be used for the same elements in the accompanying drawings.

FIG. 1 is a diagram illustrating an optical inspection system 100 according to an embodiment.

Referring to FIG. 1, the optical inspection system 100 may capture an image of a substrate SUB. The optical inspection system 100 may inspect defects of the substrate SUB using the captured image of the substrate SUB. The optical inspection system 100 may include cameras CAM1, . . . , CAMn (where n is a natural number greater than or equal to 2), inspection computers ICOM1, . . . , ICOMn, and a storage computer SCOM.

The cameras CAM1, . . . , CAMn may capture images of partitioned areas DA1, . . . , DAn of the substrate SUB, respectively. An entire area of the substrate SUB may be divided into the partitioned areas DA1, . . . , DAn. In an embodiment, the substrate SUB may have a rectangular planar shape, and the partitioned areas DA1, . . . , DAn may divide the substrate SUB in a first direction DR1. In an embodiment, for example, the cameras CAM1, . . . , CAMn may capture images of the partitioned areas DA1, . . . , Dan, respectively, while moving in a second direction DR2 perpendicular to the first direction DR1.

In an embodiment, a width of the substrate SUB in the first direction DR1 may be about 2500 centimeters (cm), and a width of the substrate SUB in the second direction DR2 may be about 2200 cm, and the optical inspection system 100 may include 20 cameras CAM1, . . . , CAMn. In such an embodiment, each of the partitioned areas DA1, . . . , DAn may have a rectangular planar shape with a length of about 125 cm in the first direction DR1 and a length of about 2200 cm in the second direction DR2. However, the size of the substrate SUB and the number of cameras CAM1, . . . , CAMn are not limited thereto.

In an embodiment, the substrate SUB may be one of a display substrate and a color conversion substrate. The display substrate may include light emitting elements, and the light emitting elements may include light emitting layers, respectively. In an embodiment, for example, the light emitting element may be an organic light emitting diode, and the light emitting layer may include an organic light emitting material. The color conversion substrate may include color conversion layers. In an embodiment, for example, the color conversion layer may include quantum dots, scatterers, or the like.

In an embodiment, the substrate SUB may include a plurality of panels PN. Each of the panels PN may correspond to a display panel when the substrate SUB is the display substrate, and each of the panels PN may correspond to a color conversion panel when the substrate SUB is the color conversion substrate. FIG. 1 illustrates an embodiment in which the substrate SUB includes four panels PN, but the present disclosure is not limited thereto. In another embodiment, the substrate SUB may include five panels PN.

The cameras CAM1, . . . , CAMn may generate partial original images IM_OP1, . . . , IM_OPn, respectively. The partial original images IM_OP1, . . . , IM_OPn may correspond to the partitioned areas DA1, . . . , DAn of the substrate SUB, respectively. In other words, the partial original images IM_OP1, . . . , IM_OPn may be images obtained by capturing the partitioned areas DA1, . . . , DAn, respectively. In an embodiment, the cameras CAM1, . . . , CAMn may generate the partial original images IM_OP1, . . . , IM_OPn at a speed of about 1.85 gigabytes/second (GB/s), respectively.

The inspection computers ICOM1, . . . , ICOMn may receive the partial original images IM_OP1, . . . , IM_OPn from the cameras CAM1, . . . , CAMn, respectively. In an embodiment, the inspection computers ICOM1, . . . , ICOMn may be connected to the cameras CAM1, . . . , CAMn, respectively. The inspection computers ICOM1, . . . , ICOMn may include hard disks for storing the partial original images IM_OP1, . . . , IM_OPn, respectively. The partial original images IM_OP1, . . . , IM_OPn may be stored in the hard disks at a speed of about 0.4 GB/s, respectively. Accordingly, the speed at which the partial original images IM_OP1, . . . , IM_OPn are stored may be slower than the speed at which the partial original images IM_OP1, . . . , IM_OPn are generated.

The inspection computers ICOM1, . . . , ICOMn may transmit the partial original images IM_OP1, . . . , IM_OPn to the storage computer SCOM through the many-to-one network NW. The inspection computers ICOM1, . . . , ICOMn may be connected to the storage computer SCOM through the many-to-one network NW in a many-to-one (e.g., n-to-one) manner.

The inspection computers ICOM1, . . . , ICOMn may detect defective portions in the partial original images IM_OP1, . . . , IM_OPn. The inspection computers ICOM1, . . . , ICOMn may store defective images including the defective portions. Defect detection software for detecting the defective portions may be installed in the inspection computers ICOM1, . . . , ICOMn.

Figure 2:
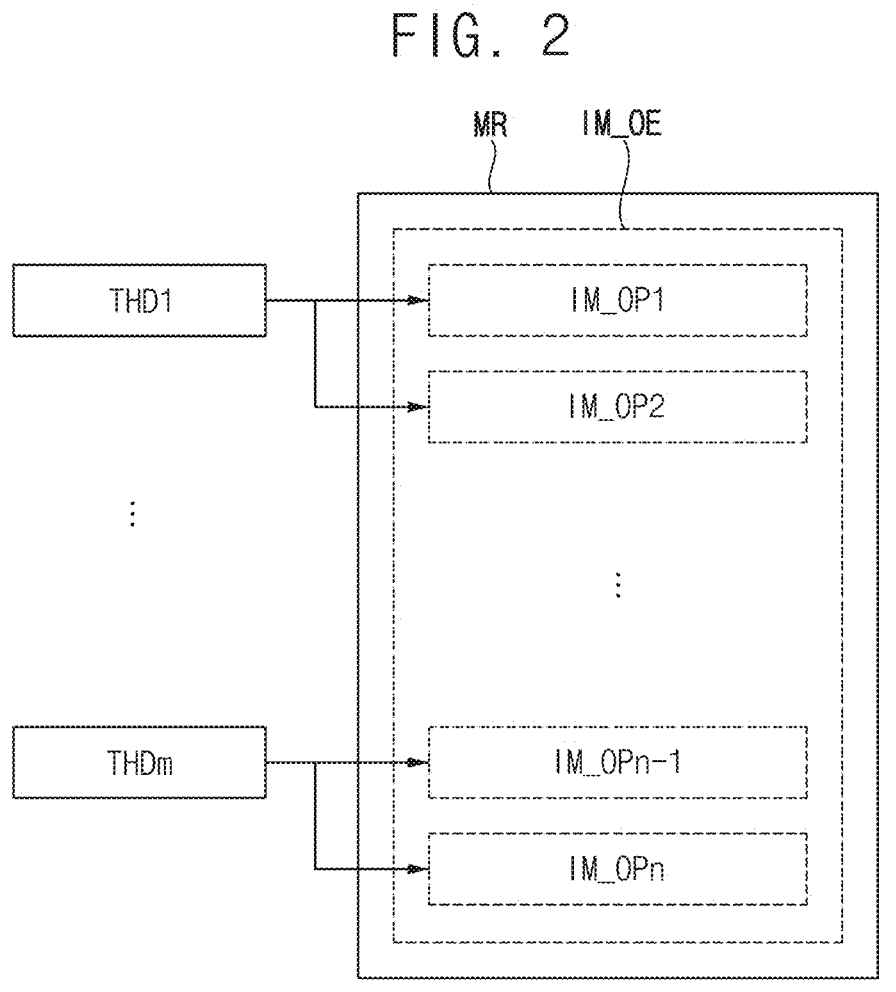

The storage computer SCOM may receive the partial original images IM_OP1, . . . , IM_OPn from the inspection computers ICOM1, . . . , ICOMn. The storage computer SCOM may generate a full original image IM_OE in FIG. 2 by merging the partial original images IM_OP1, . . . , IM_OPn. The storage computer SCOM may generate a full compressed image IM_CE in FIG. 3 by extracting an effective area EFA in FIG. 3 from the full original image IM_OE. The storage computer SCOM may store the full compressed image IM_CE.

The storage computer SCOM may include network cards NIC1, . . . , NICm (where m is a natural number greater than or equal to 2 and less than or equal to n) and a memory MR.

The network cards NIC1, . . . , NICm may be connected to the inspection computers ICOM1, . . . , ICOMn. In an embodiment, the inspection computers ICOM1, . . . , ICOMn may be connected to the network cards NIC1, . . . , NICm in a many-to-one manner. In an embodiment, for example, 5 inspection computers of the total inspection computers may be connected to one network card of the total network cards. When the optical inspection system 100 includes 20 cameras CAM1, . . . , CAMn, the storage computer SCOM may include 4 network cards NIC1, . . . , NICm. In this case, each inspection computer may be connected to one network card of the total network cards. However, the number of network cards NIC1, . . . , NICm is not limited thereto.

As the storage computer SCOM includes a plurality of network cards NIC1, . . . , NICm, the many-to-one network NW may be implemented as a high-speed network. Accordingly, when the partial original images IM_OP1, . . . , IM_OPn are generated at a speed of about 1.85 GB/s, regardless of the storage of the partial original images IM_OP1, . . . , IM_OPn, the partial original images IM_

OP1, . . . , IM_OPn may be transmitted in real time from the inspection computers ICOM1, . . . , ICOMn to the storage computer SCOM at a speed of about 37 GB/s through the many-to-one network NW.

The partial original images IM_OP1, . . . , IM_OPn may be written in the memory MR. The full original image IM_OE may be generated by the storage computer SCOM by merging the partial original images IM_OP1, . . . , IM_OPn written in the memory MR.

The storage computer SCOM may perform a stain defect inspection based on the full compressed image IM_CE. Defect inspection software for performing the stain defect inspection may be installed in the storage computer SCOM.

The storage computer SCOM may analyze causes of defects based on defects detected in the stain defect inspection. In an embodiment, for example, the causes of defects may include excessive ejections of ink nozzles, non-ejection of the ink nozzles, or the like. Accordingly, tracking and feedback of the causes of defects may be possible.

In an embodiment, the optical inspection system 100 may further include a switch SW for controlling transmission of the partial original images IM_OP1, . . . , IM_OPn through the many-to-one network NW. Some operating systems (for example, MS Windows) installed in a computer may use a switch to connect multiple computers to multiple network cards, and the switch SW may control transmission of the partial original images IM_OP1, . . . , IM_OPn when the operating system is installed in the inspection computers ICOM1, . . . , ICOMn and the storage computers SCOM.

FIG. 2 is a diagram for describing generation of the full original image IM_OE by merging the partial original images IM_OP1, . . . , IM_OPn according to an embodiment.

Referring to FIGS. 1 and 2, the storage computer SCOM may write the partial original images IM_OP1, . . . , IM_OPn into the memory MR. The storage computer SCOM may determine positions of the partial original images IM_OP1, . . . , IM_OPn by using identification numbers ("IDs") or IPs of the inspection computers ICOM1, . . . , ICOMn that transmit the partial original images IM_OP1, . . . , IM_OPn. Accordingly, the partial original images IM_OP1, . . . , IM_OPn may not be overwritten in the memory MR.

The storage computer SCOM may generate threads THD1, . . . , THDm corresponding to the number of network cards NIC1, . . . , NICm, and may simultaneously write a plurality of partial original images IM_OP1, . . . , IM_OPn in the memory MR by using the threads THD1, . . . , THDm. In an embodiment, for example, when the number of network cards NIC1, . . . , NICm is 5, 5 threads THD1, . . . , THDm may be generated. Accordingly, the partial original images IM_OP1, . . . , IM_OPn may be quickly written into the memory MR.

The storage computer SCOM may generate the full original image IM_OE by merging the partial original images IM_OP1, . . . , IM_OPn written in the memory MR.

FIG. 3 is a diagram for describing generation of the full compressed image IM_CE by extracting effective areas EFA from the full original image IM_OE according to an embodiment.

Referring to FIGS. 1 and 3, the storage computer SCOM may generate the full compressed image IM_CE by extracting the effective areas EFA from the full original image IM_OE. The effective areas EFA may be areas that are subject to defect inspection within the full original image IM_OE.

In an embodiment, the effective area EFA may correspond to an area filled with ink including one of a light emitting material and a color conversion material in the substrate SUB. When the substrate SUB is the display substrate, the light emitting layer may be formed by filling an ink containing the light emitting material in a pixel area in the substrate SUB. When the substrate SUB is the color conversion substrate, the color conversion layer may be formed by filling an ink containing the color conversion material in the pixel area in the substrate SUB. Accordingly, in such an embodiment, the effective area EFA may correspond to the pixel area of the substrate SUB.

In an embodiment, the storage computer SCOM may generate the full compressed image IM_CE by compressing (in other words, "matching") the effective area EFA defined by a plurality of first pixels PX1 into one second pixel PX2 by using an image processing filter. Accordingly, the full compressed image IM_CE may include a plurality of second pixels PX2 to which the plurality of effective areas EFA are compressed (i.e., matched), respectively. For example, the effective area EFA may be defined as 400 first pixels PX1 arranged in a 20×20 matrix, and in this case, 400 first pixels PX1 may be compressed (i.e., matched) into one second pixel PX2. Here, each of the first pixels PX1 may mean a point in the full original image IM_OE generated by one charge coupled device ("CCD") included in each of the cameras CAM1, . . . , CAMn.

In an embodiment, the image processing filter may include one of an average filter, a median filter, a minimum filter, a maximum filter, a most frequent value filter, and a Gaussian filter. When the image processing filter is the average filter, the second pixel PX2 may have an average value of grayscale levels of the first pixels PX1 in the effective area EFA. When the image processing filter is the median filter, the second pixel PX2 may have a median value of the grayscale levels of the first pixels PX1 in the effective area EFA. When the image processing filter is the minimum filter, the second pixel PX2 may have a minimum value of the grayscale levels of the first pixels PX1 in the effective area EFA. When the image processing filter is the maximum filter, the second pixel PX2 may have a maximum value of the grayscale levels of the first pixels PX1 in the effective area EFA. When the image processing filter is the most frequent value filter, the second pixel PX2 may have a value corresponding to a grayscale level of the highest frequency among the grayscale levels of the first pixels PX1 in the effective area EFA.

Figure 4:
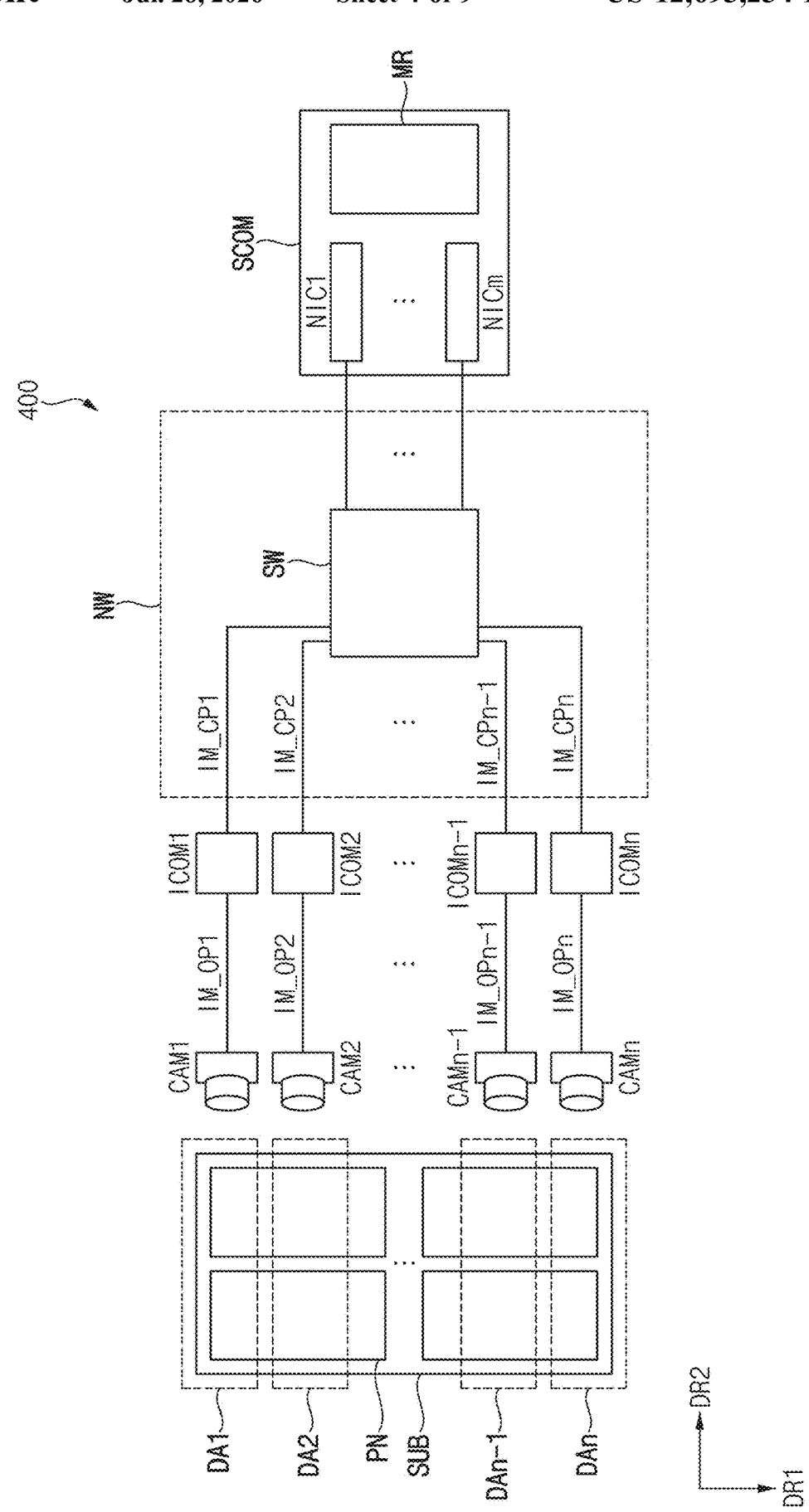
FIG. 4 is a diagram illustrating an optical inspection system according to another embodiment.

FIG. 4 is a diagram illustrating an optical inspection system 400 according to another embodiment. Descriptions of components of the optical inspection system 400 described with reference to FIGS. 4 to 6, which are substantially the same as or similar to those of the optical inspection system 100 described with reference to FIGS. 1 to 3, will be omitted.

Referring to FIG. 4, the optical inspection system 400 may include cameras CAM1, . . . , CAMn, inspection computers ICOM1, . . . , ICOMn, and a storage computer SCOM.

The cameras CAM1, . . . , CAMn may capture images of partitioned areas DA1, . . . , DAn of a substrate SUB, respectively. The cameras CAM1, . . . , CAMn may generate partial original images IM_OP1, . . . , IM_OPn, respectively. The partial original images IM_OP1, . . . , IM_OPn may correspond to the partitioned areas DA1, . . . , DAn of the substrate SUB, respectively.

The inspection computers ICOM1, . . . , ICOMn may receive the partial original images IM_OP1, . . . , IM_OPn from the cameras CAM1, . . . , CAMn, respectively. The inspection computers ICOM1, . . . , ICOMn may generate partial compressed images IM_CP1, . . . , IM_CPn by extracting an effective area EFA in FIG. 5 from each of the partial original images IM_OP1, . . . , IM_OPn. The inspection computers ICOM1, . . . , ICOMn may transmit the partial compressed images IM_CP1, . . . , IM_CPn to the storage computer SCOM through a many-to-one network NW.

The inspection computers ICOM1, . . . , ICOMn may detect defective portions in the partial original images IM_OP1, . . . , IM_OPn. The inspection computers ICOM1, . . . , ICOMn may store defective images including the defective portions.

The storage computer SCOM may receive the partial compressed images IM_CP1, . . . , IM_CPn from the inspection computers ICOM1, . . . , ICOMn. The storage computer SCOM may generate a full compressed image IM_CE in FIG. 6 by merging the partial compressed images IM_CP1, . . . , IM_CPn. The storage computer SCOM may store the full compressed image IM_CE.

The storage computer SCOM may include network cards NIC1, . . . , NICm and a memory MR.

The network cards NIC1, . . . , NICm may be connected to the inspection computers ICOM1, . . . , ICOMn. In an embodiment, the inspection computers ICOM1, . . . , ICOMn may be connected to the network cards NIC1, . . . , NICm in a many-to-one manner.

The partial compressed images IM_CP1, . . . , IM_CPn may be written in the memory MR. The full compressed image IM_CE may be generated by merging the partial compressed image IM_CP1, . . . , IM_CPn written in the memory MR.

The storage computer SCOM may perform a stain defect inspection based on the full compressed image IM_CE.

The storage computer SCOM may analyze causes of defects based on defects detected in the stain defect inspection.

In an embodiment, the optical inspection system 400 may further include a switch SW for controlling transmission of the partial compressed images IM_CP1, . . . , IM_CPn through the many-to-one network NW.

Figure 5:
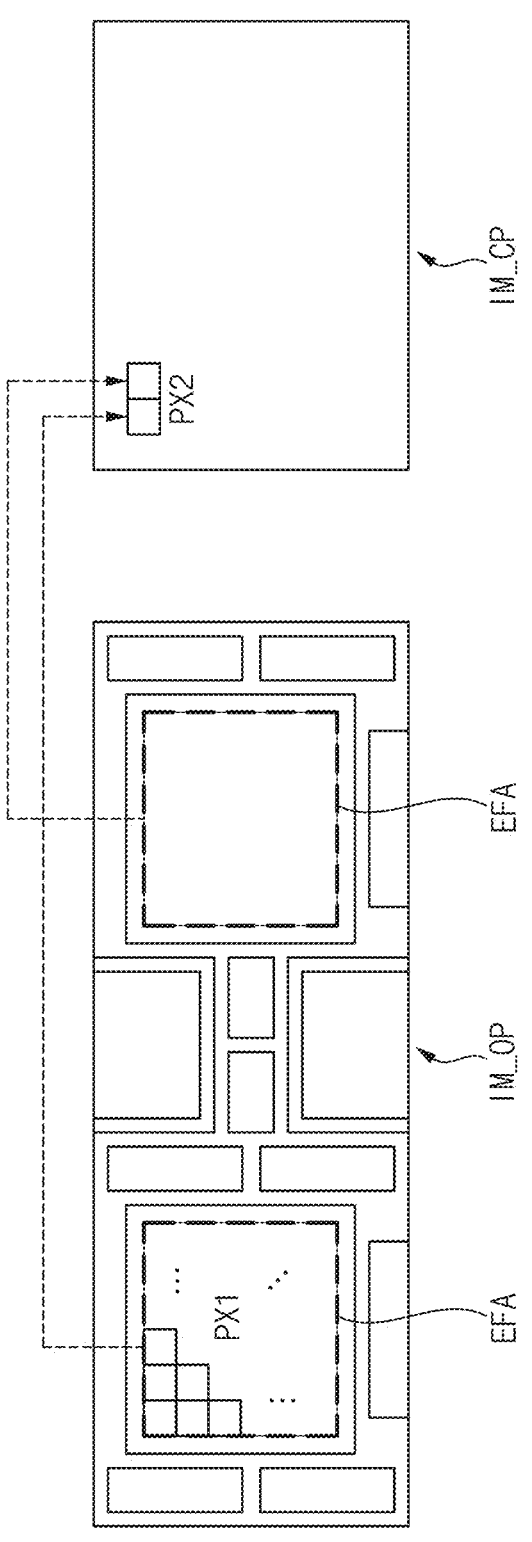
FIG. 5 is a diagram for describing generation of a partial compressed image by extracting effective areas from a partial original image according to another embodiment.

FIG. 5 is a diagram for describing generation of the partial compressed image IM_CP by extracting effective areas EFA from the partial original image IM_OP according to an embodiment. The partial original image IM_OP in FIG. 5 may be one of the partial original images IM_OP1, . . . , IM_OPn in FIG. 4, and the partial compressed image IM_CP in FIG. 5 may be a partial compressed image corresponding to the partial original image IM_OP among the partial compressed images IM_CP1, . . . , IM_CPn.

Referring to FIGS. 4 and 5, each of the inspection computers ICOM1, . . . , ICOMn may generate the partial compressed image IM_CP by extracting the effective areas EFA from the partial original image IM_OP. The effective areas EFA may be areas that are subject to defect inspection within the partial original image IM_OP.

In an embodiment, the effective area EFA may correspond to an area filled with ink including one of a light emitting material and a color conversion material in the substrate SUB.

In an embodiment, each of the inspection computers ICOM1, . . . , ICOMn may generate the partial compressed image IM_CP by compressing or matching the effective area EFA defined by a plurality of first pixels PX1 into one second pixel PX2 by using an image processing filter. Accordingly, the partial compressed image IM_CP may include a plurality of second pixels PX2 in which a plurality of effective areas EFA are compressed (i.e., matched), respectively.

In an embodiment, the image processing filter may include one of an average filter, a median filter, a minimum filter, a maximum filter, a most frequent value filter, and a Gaussian filter.

Figure 6:
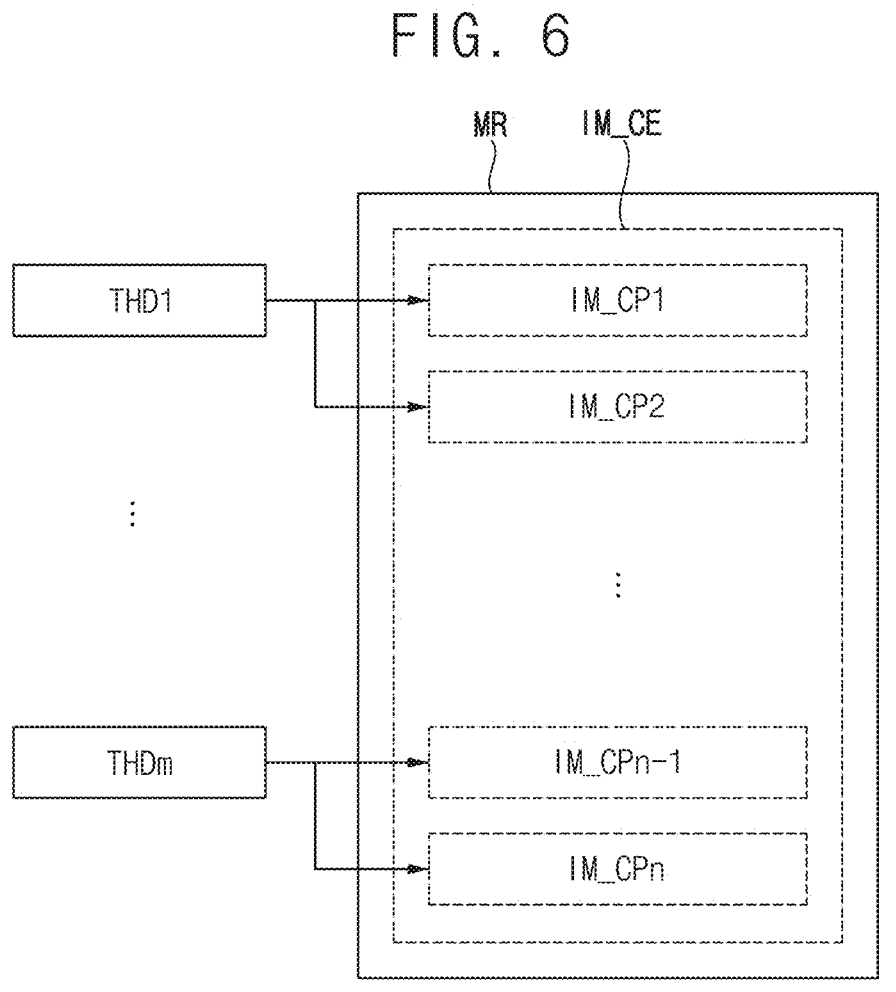

FIG. 6 is a diagram for describing generation of the full compressed image IM_CE by merging the partial compressed images IM_CP1, . . . , IM_CPn according to another embodiment.

Referring to FIGS. 4 and 6, the storage computer SCOM may write the partial compressed images IM_CP1, . . . , IM_CPn in the memory MR. The storage computer SCOM may determine positions of the partial compressed images IM_CP1, . . . , IM_CPn by using IDs or IPs of the inspection computers ICOM1, . . . , ICOMn that transmit the partial compressed images IM_CP1, . . . , IM_CPn.

The storage computer SCOM may generate threads THD1, . . . , THDm corresponding to the number of network cards NIC1, . . . , NICm, and a plurality of partial compressed images IM_CP1, . . . , IM_CPn may be simultaneous stored in the memory MR by using the threads THD1, . . . , THDm.

The storage computer SCOM may generate the full compressed image IM_CE by merging the partial compressed images IM_CP1, . . . , IM_CPn written in the memory MR.

FIG. 7 is a diagram illustrating the full original image IM_OE and the full compressed image IM_CE according to an embodiment.

Referring to FIG. 7, when the substrate SUB includes a line stain defect, the line stain defect of the substrate SUB may be recognized not only in the full original image IM_OE but also in the full compressed image IM_CE. Accordingly, although the storage computer SCOM performs the stain defect inspection based on the full compressed image IM_CE, the storage computer SCOM may detect the line stain defect of the substrate SUB.

Since the size of the full compressed image IM_CE (e.g., about 1.2 megabytes (MB)) is much smaller than the size of the full original image IM_OE (e.g., about 2.5 gigabytes (GB)), the storage computer SCOM may store a relatively large number of full compressed images IM_CE. Accordingly, defect generation history and defect generation trend of the substrates SUB may be tracked based on a large number of full compressed images IM_CE stored in the storage computer SCOM. Therefore, the management of defects of the substrates SUB may be facilitated.

Figure 8:
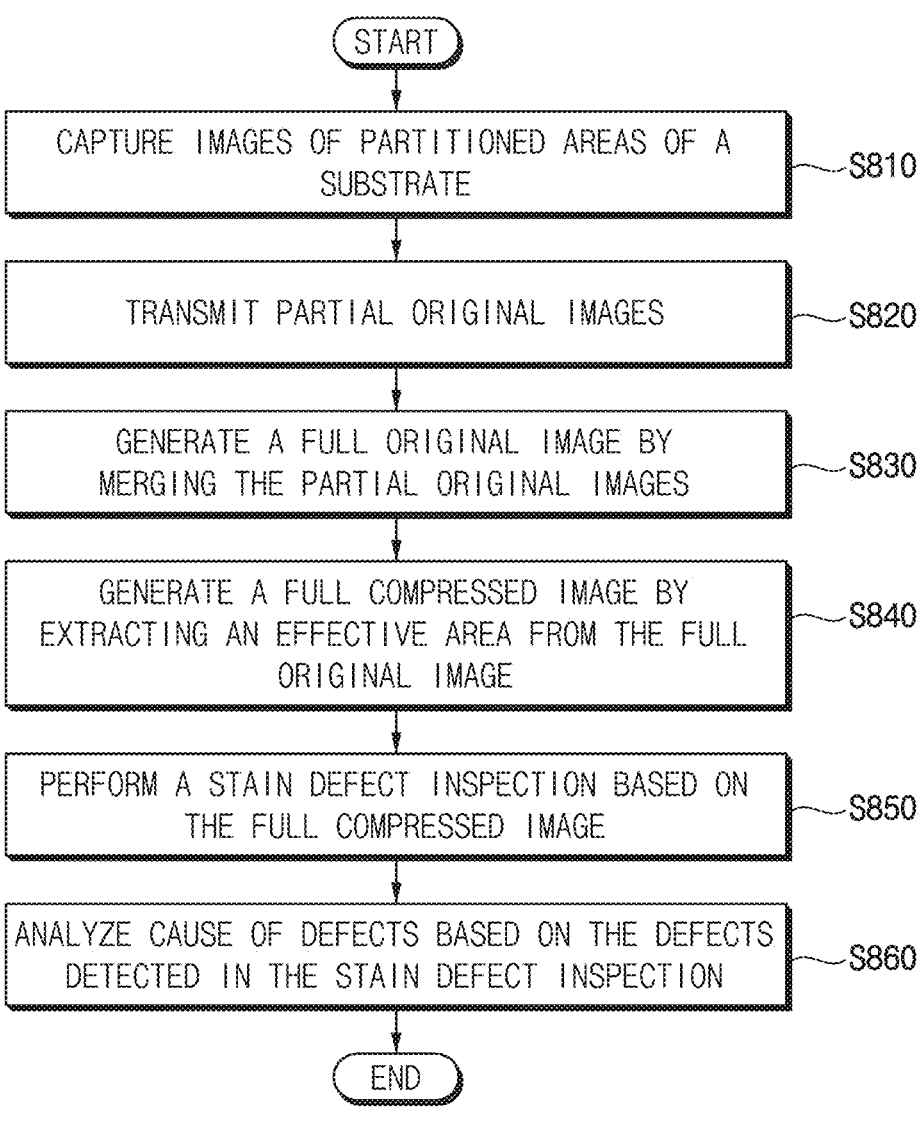
FIG. 8 is a flowchart illustrating an optical inspection method according to an embodiment.

FIG. 8 is a flowchart illustrating an optical inspection method according to an embodiment. FIG. 8 may illustrate an optical inspection method using the optical inspection system 100 described with reference to FIGS. 1 to 3.

Referring to FIGS. 1 to 3 and 8, in the optical inspection method, the cameras CAM1, . . . , CAMn may capture images of the partitioned areas DA1, . . . , DAn of the substrate SUB, respectively (S810). The cameras CAM1, . . . , CAMn may generate the partial original images IM_OP1, . . . , IM_OPn, respectively. The partial original images IM_OP1, . . . , IM_OPn may correspond to the partitioned areas DA1, . . . , DAn of the substrate SUB, respectively.

The inspection computers ICOM1, . . . , ICOMn may transmit the partial original images IM_OP1, . . . , IM_OPn to the storage computer SCOM through the many-to-one network NW (S820). The inspection computers ICOM1, . . . , ICOMn may detect defective portions in the partial original images IM_OP1, . . . , IM_OPn. The inspection computers ICOM1, . . . , ICOMn may store defective images including the defective portions.

The storage computer SCOM may generate the full original image IM_OE by merging the partial original images IM_OP1, . . . , IM_OPn (S830).

The storage computer SCOM may generate the full compressed image IM_CE by extracting the effective area EFA from the full original image IM_OE (S840). In an embodiment, the effective area EFA may correspond to an area filled with ink including one of a light emitting material and a color conversion material in the substrate SUB.

In an embodiment, the storage computer SCOM may generate the full compressed image IM_CE by compressing (i.e., matching) the effective area EFA defined by a plurality of first pixels PX1 into one second pixel PX2 by using an image processing filter. Accordingly, the full compressed image IM_CE may include a plurality of second pixels PX2 in which a plurality of effective areas EFA are compressed (i.e., matched), respectively. In an embodiment, the image processing filter may include one of an average filter, a median filter, a minimum filter, a maximum filter, a most frequent value filter, and a Gaussian filter.

The storage computer SCOM may store the full compressed image IM_CE. The storage computer SCOM may perform a stain defect inspection based on the full compressed image IM_CE (S850). The storage computer SCOM may analyze cause of defects based on the defects detected in the stain defect inspection (S860).

FIG. 9 is a flowchart illustrating an optical inspection method according to another embodiment. FIG. 9 may illustrate an optical inspection method using the optical inspection system 400 described with reference to FIGS. 4 to 6. Descriptions of steps of the optical inspection method described with reference to FIG. 9, which are substantially the same as or similar to those of the optical inspection method described with reference to FIG. 8, are omitted.

Referring to FIGS. 4 to 6 and 9, in the optical inspection method, the cameras CAM1, . . . , CAMn may capture images of the partitioned areas DA1, . . . , DAn of the substrate SUB, respectively (S910).

The inspection computers ICOM1, . . . , ICOMn may generate the partial compressed images IM_CP1, . . . , IM_CPn by extracting the effective area EFA from each of the partial original images IM_OP1, . . . , IM_OPn (S920). In an embodiment, each of the inspection computers ICOM1, . . . , ICOMn may generate the partial compressed image IM_CP by compressing the effective area EFA defined by a plurality of first pixels PX1 into one second pixel PX2 by using an image processing filter. Accordingly, the partial compressed image IM_CP may include a plurality of second pixels PX2 in which a plurality of effective areas EFA are compressed (i.e., matched), respectively.

The inspection computers ICOM1, . . . , ICOMn may transmit the partial compressed images IM_CP1, . . . , IM_CPn to the storage computer SCOM through the many-to-one network NW (S930).

The storage computer SCOM may generate the full compressed image IM_CE by merging the partial compressed images IM_CP1, . . . , IM_CPn (S940). The storage computer SCOM may store the full compressed image IM_CE.

The storage computer SCOM may perform a stain defect inspection based on the full compressed image IM_CE (S950). The storage computer SCOM may analyze cause of defects based on the defects detected in the stain defect inspection (S960).

The optical inspection system and the optical inspection method according to the embodiments may be applied to a process of manufacturing a display device included in a computer, a notebook, a mobile phone, a smart phone, a smart pad, a PMP, a PDA, an MP3 player, or the like.

Although the optical inspection systems and the optical inspection methods according to the embodiments have been described with reference to the drawings, the illustrated embodiments are examples, and may be modified and changed by a person having ordinary knowledge in the relevant technical field without departing from the technical spirit described in the following claims.

What is claimed is:

1. An optical inspection system, comprising:
cameras, which capture images of partitioned areas of a substrate, respectively;
inspection computers, which receive partial original images corresponding to the partitioned areas from the cameras, respectively, and transmit the partial original images through a many-to-one network; and
a storage computer, which receives the partial original images, generates a full original image by merging the partial original images, and generates a full compressed image by extracting an effective area from the full original image,
wherein the storage computer includes:
network cards connected to the inspection computers; and
a memory configured to store the partial original images.

2. The optical inspection system of claim 1, wherein the inspection computers are connected to the network cards in a many-to-one manner.

3. The optical inspection system of claim 1, wherein the storage computer compresses the effective area defined by a plurality of first pixels into a second pixel using an image processing filter, and
wherein the full compressed image includes the second pixel.

4. The optical inspection system of claim 3, wherein the image processing filter includes one of an average filter, a median filter, a minimum filter, a maximum filter, a most frequent value filter, and a Gaussian filter.

5. The optical inspection system of claim 1, wherein the effective area corresponds to an area in which an ink including one of a light emitting material and a color conversion material is filled in the substrate.

6. The optical inspection system of claim 1, wherein the inspection computers detect a defective portion from the partial original images and store a defective image including the defective portion.

7. The optical inspection system of claim 1, wherein the storage computer performs a stain defect inspection based on the full compressed image.

8. The optical inspection system of claim 1, further comprising:
a switch, which controls a transmission of the partial original images through the many-to-one network.

9. The optical inspection system of claim 1, wherein the substrate is one of a display substrate including a light emitting layer of a light emitting element and a color conversion substrate including a color conversion layer.

10. An optical inspection system, comprising:
cameras, which capture images of partitioned areas of a substrate, respectively;
inspection computers, which receive partial original images corresponding to the partitioned areas from the cameras, respectively, generate partial compressed images by extracting an effective area from each of the partial original images, and transmit the partial compressed images through a many-to-one network; and
a storage computer, which receives the partial compressed images and generates a full compressed image by merging the partial compressed images,
wherein the storage computer includes:
network cards connected to the inspection computers; and
a memory configured to store the partial compressed images.

11. The optical inspection system of claim 10, wherein each of the inspection computers compresses a corresponding effective area defined by a plurality of first pixels into a second pixel using an image processing filter, and
wherein each of the partial compressed images includes the second pixel.

12. The optical inspection system of claim 10, further comprising:
a switch, which controls a transmission of the partial compressed images through the many-to-one network.

13. An optical inspection method, comprising:
capturing images of partitioned areas of a substrate;
transmitting partial original images corresponding to the partitioned areas, respectively, through a many-to-one network;
generating a full original image by merging the partial original images; and
generating a full compressed image by extracting an effective area from the full original image,
wherein generating the full compressed image includes compressing the effective area defined by a plurality of first pixels into a second pixel using an image processing filter, and
wherein the full compressed image includes the second pixel.

14. The optical inspection method of claim 13, wherein the image processing filter includes one of an average filter, a median filter, a minimum filter, a maximum filter, a most frequent value filter, and a Gaussian filter.

15. The optical inspection method of claim 13, further comprising:
detecting a defective portion from the partial original images; and
storing a defective image including the defective portion.

16. The optical inspection method of claim 13, further comprising:
performing a stain defect inspection based on the full compressed image.

17. The optical inspection method of claim 13, wherein the substrate is one of a display substrate including a light emitting layer of a light emitting element and a color conversion substrate including a color conversion layer.

* * * * *